UNITED STATES PATENT OFFICE.

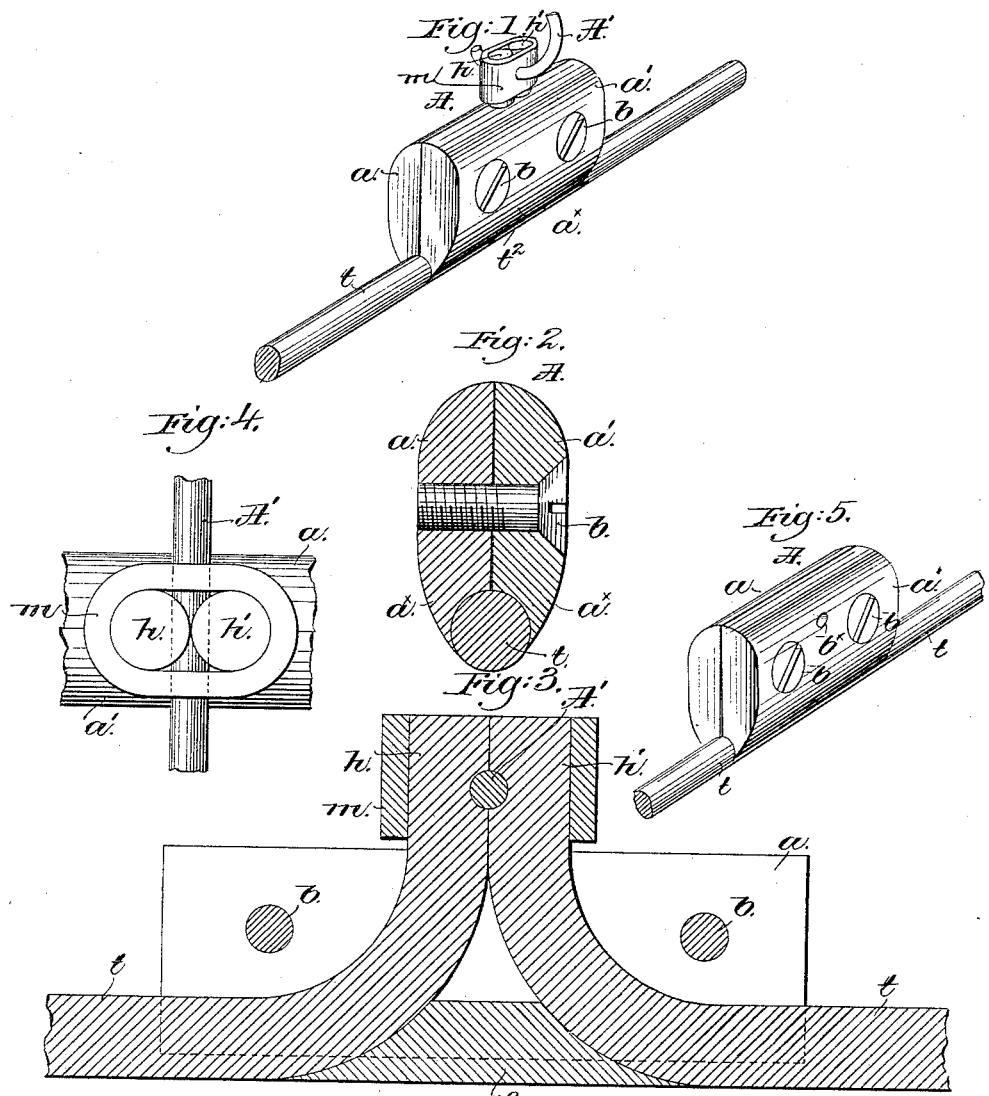

WILLIAM VOGLER, OF SOMERVILLE, MASSACHUSETTS.

TROLLEY-WIRE CLAMP OR SUPPORT.

SPECIFICATION forming part of Letters Patent No. 445,103, dated January 20, 1891.

Application filed April 8, 1890. Serial No. 347,047. (No model.)

*To all whom it may concern:*

Be it known that I, WILLIAM VOGLER, of Somerville, county of Middlesex, State of Massachusetts, have invented an Improvement in Trolley-Wire Clamps or Supports, of which the following description, in connection with the accompanying drawings, is a specification, like letters on the drawings representing like parts.

This invention has for its object to provide a trolley-wire clamp or support whereby a trolley-wire may be supported or hung so as to present a straight and unobstructed surface of wire on which the trolley-wheel may roll.

My invention consists, essentially, of a trolley-wire clamp or support comprising two members provided each with a groove at its inner side, and means for clamping said members together to embrace a trolley-wire for more than one-half of its circumference.

Figure 1 is a perspective view of my improved clamp as it appears when supporting the trolley-wire; Fig. 2, an enlarged cross-section of the clamp or support shown in Fig. 1; Fig. 3, a vertical longitudinal section of the same; Fig. 4, a partial top view of Fig. 3, and Fig. 5 a modification showing the support applied upon the wire between its ends.

Referring to the drawings, the clamp or support A is shown as composed of two halves or members $a$ $a'$, grooved at their inner faces near their lower edges to receive the trolley-wire $t$, the said grooves being of sufficient size to enable the clamp to embrace the trolley-wire for more than one-half of its circumference. The two members $a$ $a'$ are clamped together by screws $b$, to thus hold the trolley-wire between them, as shown. The outer faces of the members $a$ $a'$, as herein shown, are curved or beveled at their lower edges, as at $a^x$, to meet the trolley-wire $t$, to thus enable the trolley-wheel to pass freely along the wire when the latter is held in its position by the clamp or support.

The clamp in Figs. 1 to 4 is shown as of such shape as to hold and secure together the ends $h$ $h'$ of two sections or lengths of the trolley-wire $t$, the ends of the said wires being brought up together, the two members of the clamp being properly grooved to receive them, the ends of the wires projecting above the support being preferably bound together by a metal band $m$, through which a hook or eye $A'$ may be passed to support the same, the said hook or eye also passing through a portion of the inner sides of the upturned ends of the trolley-wire, as shown, thus serving as a key to lock the said ends together to prevent them from being drawn out. By bringing the ends of the two wires together, as shown, an objectionable break is left in the continuity of the wire, to obviate which I have provided a short piece of wire $t^2$, suitably shaped to fill the space or break, the said piece $t^2$ being held in place by the grooves in the support, and in this way presenting a straight surface on which the trolley-wheel may roll.

The upper portion of the clamp A is preferably rounded, as shown, to better shed water or other undesirable substance.

In Fig. 5 I have shown the clamp as applied to a trolley-wire between its ends, the clamp embracing more than one-half of the circumference of the wire and holding it firmly, leaving the under side of the wire at a uniform distance below the under side of the clamp, thus presenting a smooth continuous wire surface for the trolley-wheel.

The clamp shown in Fig. 5 may be provided with a transverse hole $b^x$ to receive a hook or eye for the support of the same.

I do not desire to limit myself to the precise shape of support shown, as the same may be varied somewhat without departing from the scope of this invention. Neither do I desire to limit myself to the screws or bolts $b$ for clamping the two members together, as any other well-known means may be employed.

I claim—

1. A trolley-wire support consisting of two members grooved at their inner sides to inclose a trolley-wire for more than one-half of its circumference, means to clamp said members together, and a locking device to retain the ends of the wire, substantially as described.

2. A trolley-wire clamp or support comprising two members grooved on their contacting faces to receive and inclose a trolley-wire, and means for clamping said members together, combined with a filling-piece
5 of wire, as $t^2$, to operate substantially as described.

In testimony whereof I have signed my name to this specification in the presence of two subscribing witnesses.

WILLIAM VOGLER.

Witnesses:
GEO. W. GREGORY,
FREDERICK L. EMERY.